(12) United States Patent
Velichko

(10) Patent No.: US 9,302,694 B2
(45) Date of Patent: Apr. 5, 2016

(54) CONVERTIBLE BABY STROLLER ASSEMBLY

(71) Applicant: Marina Velichko, San Carlos, CA (US)

(72) Inventor: Marina Velichko, San Carlos, CA (US)

( * ) Notice: Subject to any disclaimer, the term of this patent is extended or adjusted under 35 U.S.C. 154(b) by 0 days.

(21) Appl. No.: 14/335,285

(22) Filed: Jul. 18, 2014

(65) Prior Publication Data

US 2016/0016601 A1    Jan. 21, 2016

(51) Int. Cl.
*B62B 3/02*    (2006.01)
*B62B 7/12*    (2006.01)

(52) U.S. Cl.
CPC ........................................ *B62B 7/12* (2013.01)

(58) Field of Classification Search
CPC .......... B62B 3/02; B62B 3/022; B62B 5/065; B62B 5/08; B62B 5/082; B62B 5/085; B62B 5/087; B62B 7/10; B62B 7/06; B62B 9/06
USPC ................... 280/30, 638, 35, 657, 658, 47.38
See application file for complete search history.

(56) References Cited

U.S. PATENT DOCUMENTS

| 2,134,904 | A | | 11/1938 | Bacon, Jr. | |
|---|---|---|---|---|---|
| 2,225,999 | A | | 12/1940 | Kroll et al. | |
| 2,604,333 | A | * | 7/1952 | Elmer | 280/37 |
| 3,330,575 | A | * | 7/1967 | Boudreau | 280/648 |
| 3,738,700 | A | | 6/1973 | Terry | |
| D310,645 | S | | 9/1990 | Julien | |
| 5,125,674 | A | | 6/1992 | Manuszak | |
| 6,139,046 | A | * | 10/2000 | Aalund et al. | 280/642 |
| 6,755,435 | B2 | | 6/2004 | Hsia | |
| 7,891,732 | B2 | * | 2/2011 | Hei et al. | 297/184.13 |
| 8,316,483 | B2 | | 11/2012 | Thomas et al. | |
| 2011/0079972 | A1 | * | 4/2011 | Watson | 280/47.4 |
| 2011/0204598 | A1 | * | 8/2011 | Stevenson | 280/639 |

FOREIGN PATENT DOCUMENTS

CN           85103317 B      4/1985

* cited by examiner

*Primary Examiner* — Bryan Evans

(57) ABSTRACT

A convertible baby stroller assembly converts into a playpen as needed. The assembly includes a support having a bottom wall and a perimeter wall coupled to and extending upwardly from the bottom wall. A top edge of the support defines an access opening into an interior space of the support wherein the interior space is configured for receiving a child. A plurality of panels is coupled to the support. The panels are positionable in a deployed position wherein each of the panels extends upwardly above the top edge around the access opening defining an upper enclosure of the assembly. A frame has an upper section and a lower section. The upper section defines a handle. The support is coupled to the frame at a juncture between the upper and lower sections. A plurality of wheels is coupled to the lower section of the frame.

16 Claims, 6 Drawing Sheets

CONVERTIBLE BABY STROLLER ASSEMBLY

BACKGROUND OF THE DISCLOSURE

Field of the Disclosure

The disclosure relates to baby stroller assemblies and more particularly pertains to a new baby stroller assembly for converting into a playpen as needed.

SUMMARY OF THE DISCLOSURE

An embodiment of the disclosure meets the needs presented above by generally comprising a support having a bottom wall and a perimeter wall coupled to and extending upwardly from the bottom wall. A top edge of the support defines an access opening into an interior space of the support wherein the interior space is configured for receiving a child. A plurality of panels is coupled to the support. The panels are positionable in a deployed position wherein each of the panels extends upwardly above the top edge around the access opening defining an upper enclosure of the assembly. A frame has an upper section and a lower section. The upper section defines a handle. The support is coupled to the frame at a juncture between the upper and lower sections. A plurality of wheels is coupled to the lower section of the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
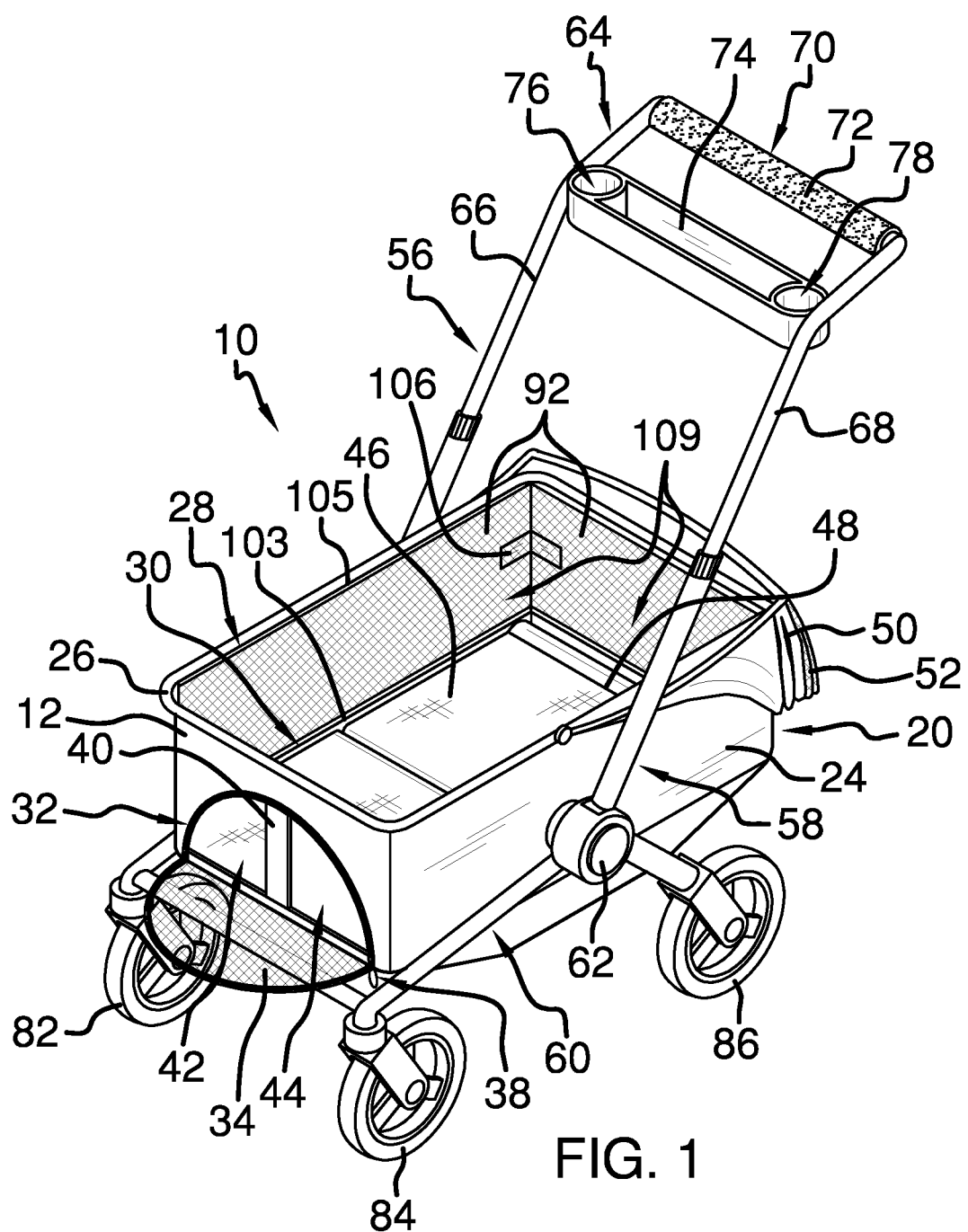
FIG. 1 is a top front side perspective view of a convertible baby stroller assembly according to an embodiment of the disclosure.
Figure 2:
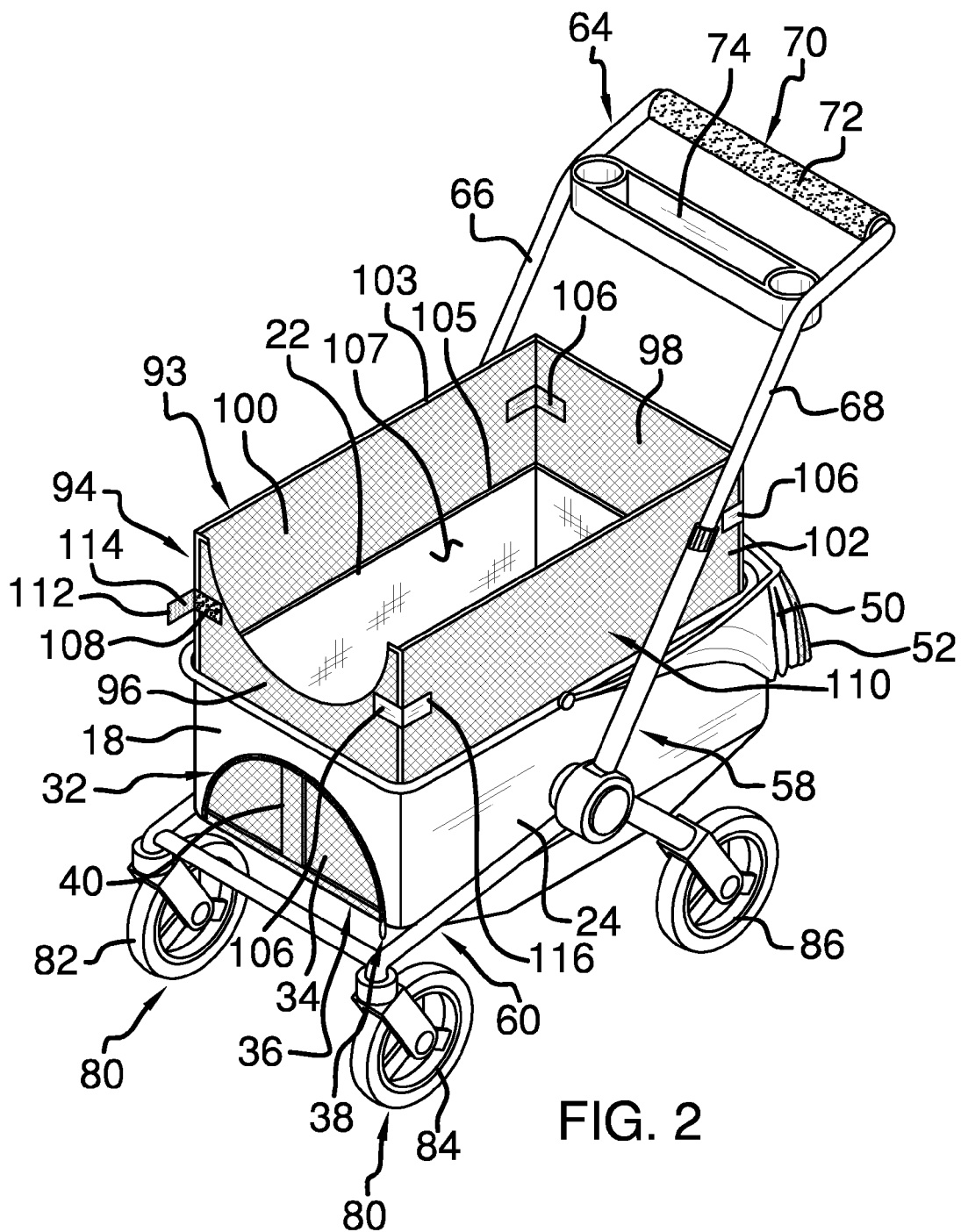
FIG. 2 is a top front side perspective view of an embodiment of the disclosure similar to FIG. 1, except that FIG. 2 shows the panels in a deployed position.
Figure 3:
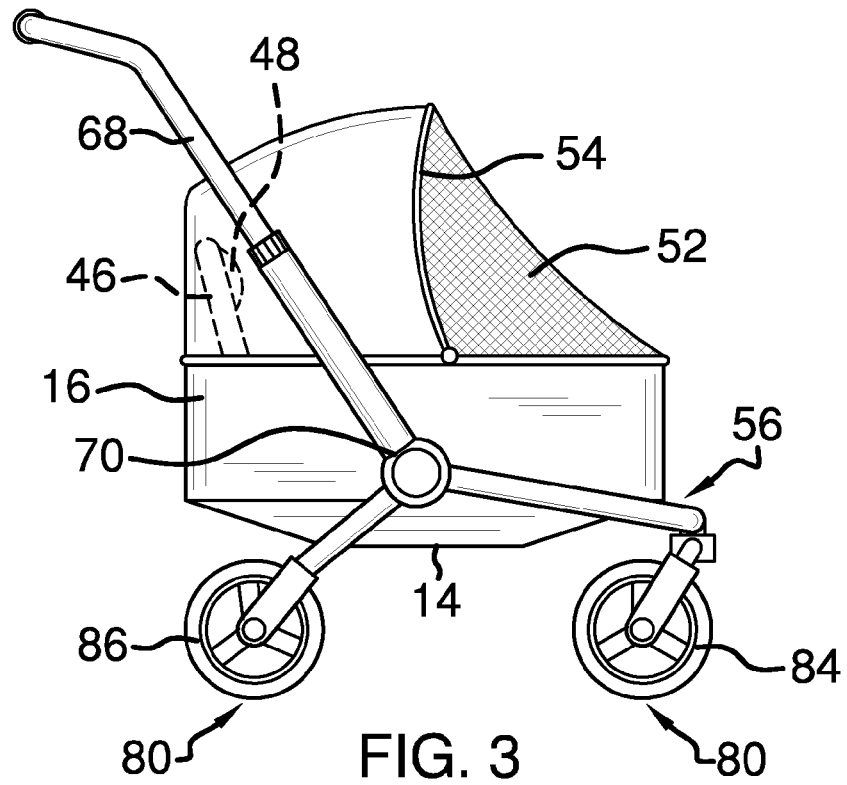
FIG. 3 is a side view of an embodiment of the disclosure showing the canopy in an extended position.
Figure 4:
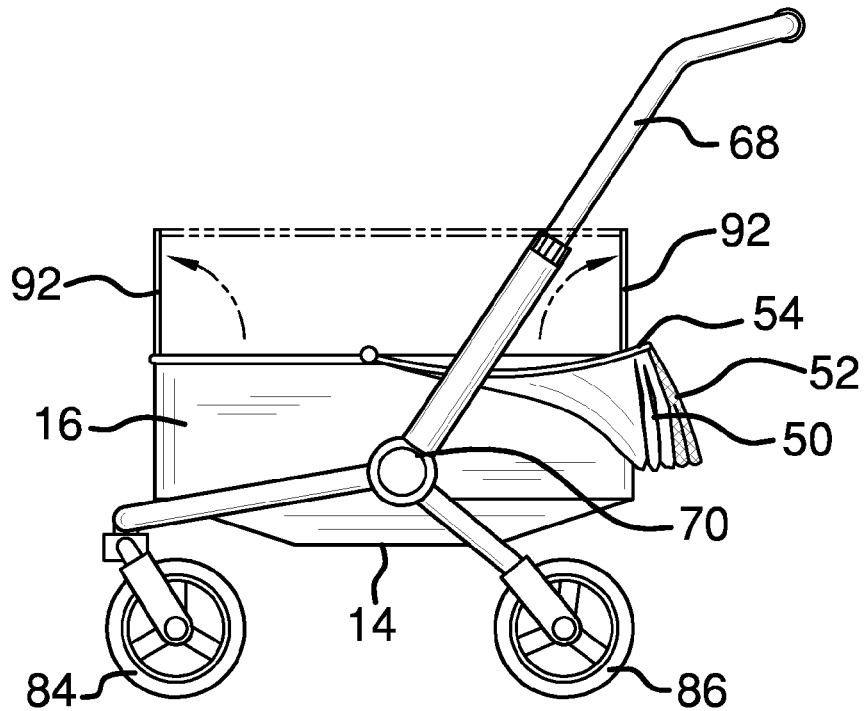
FIG. 4 is a side view of an embodiment of the disclosure showing the canopy in a retracted position.
Figure 5:
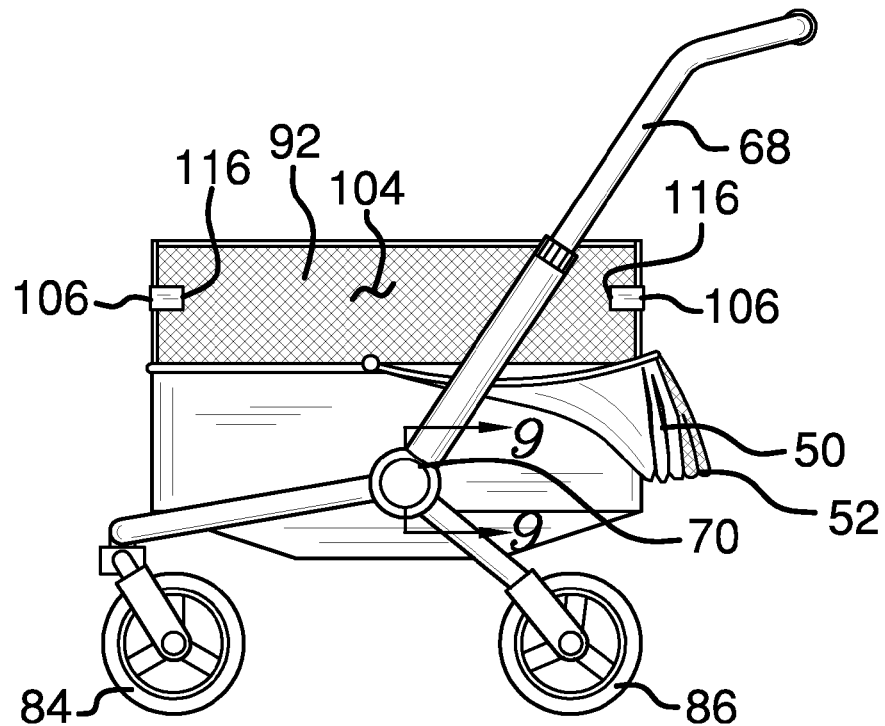
FIG. 5 is a side view of an embodiment of the disclosure showing the panels in the deployed position.
Figure 6:
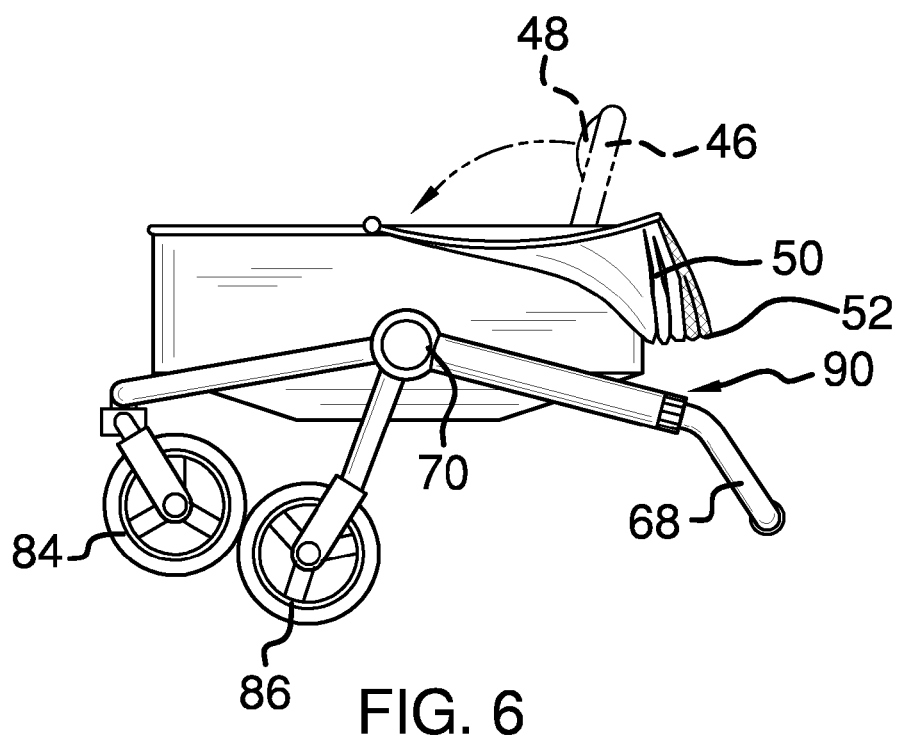
FIG. 6 is a side view of an embodiment of the disclosure showing the assembly in a collapsed position.
Figure 7:
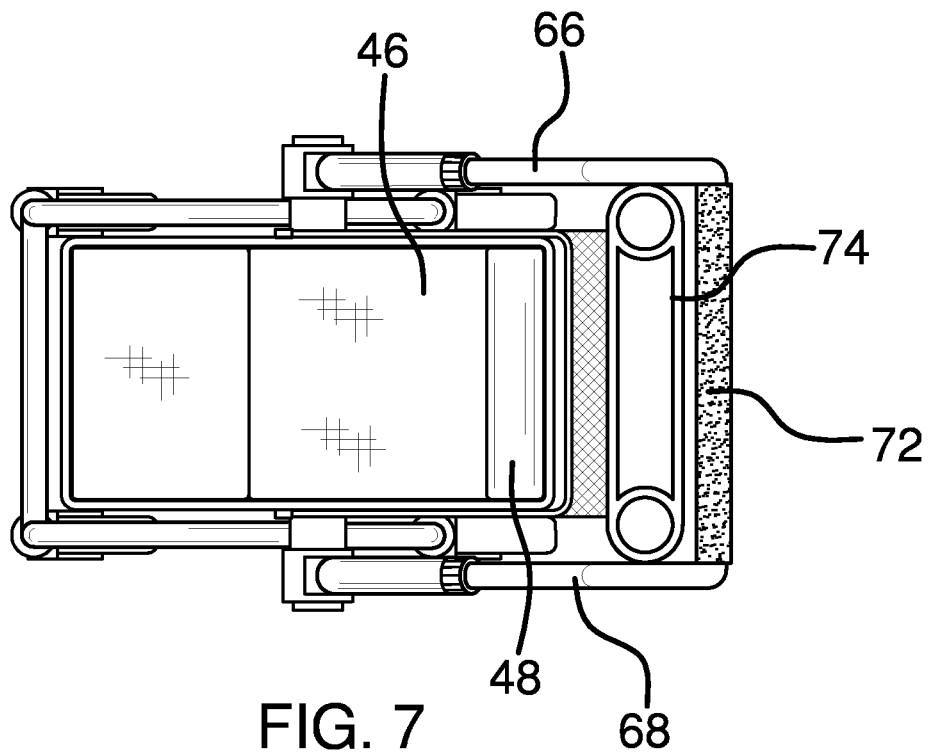
FIG. 7 is a top view of an embodiment of the disclosure showing the seat pivoted downwardly and positioned horizontally relative to the bottom wall of the support.
Figure 8:
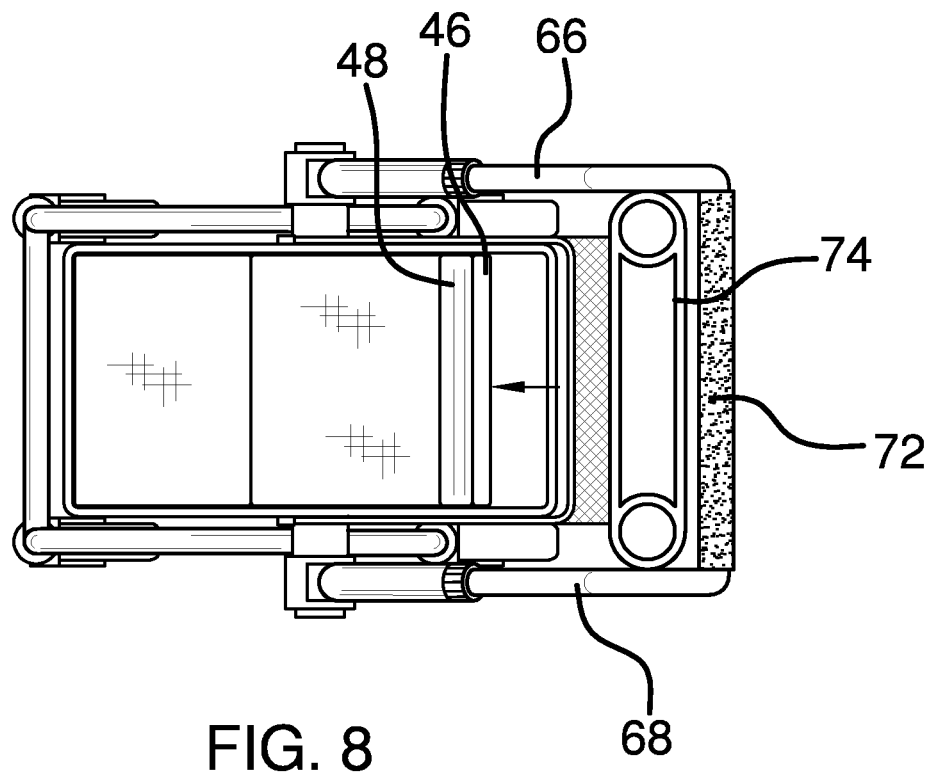
FIG. 8 is a top view of an embodiment of the disclosure showing the seat pivoted upwardly relative to the bottom wall of the support.
Figure 9:
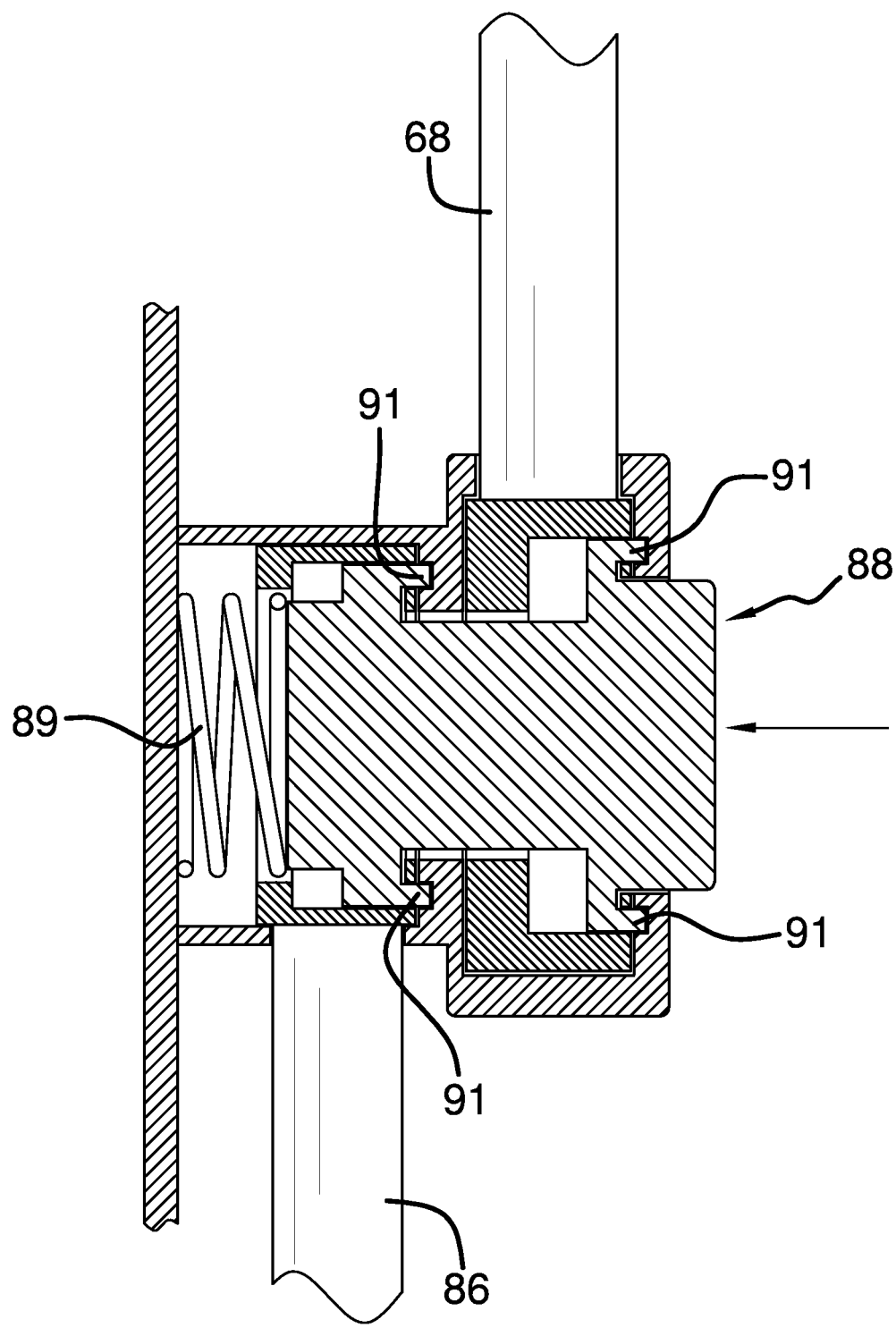
FIG. 9 is a cross-sectional view of an embodiment of the disclosure taken along line 9-9 of FIG. 5.

With reference now to the drawings, and in particular to FIGS. 1 through 9 thereof, a new baby stroller assembly embodying the principles and concepts of an embodiment of the disclosure and generally designated by the reference numeral 10 will be described.

As best illustrated in FIGS. 1 through 9, the convertible baby stroller assembly 10 generally comprises a support 12 having a bottom wall 14 and a perimeter wall 16 coupled to and extending upwardly from the bottom wall 14. The perimeter wall 16 includes a front wall 18, a rear wall 20, a first lateral wall 22 and a second lateral wall 24. The first 22 and second 24 lateral walls are coupled to and extend between the front 18 and rear 20 walls. A top edge 26 of the support 12 defines an access opening 28 into an interior space 30 of the support 12 wherein the interior space 30 is configured for receiving a child. The perimeter wall 16 may have a height extending from the bottom wall 14 to the top edge 26 measuring between approximately 25.0 cm and 35.0 cm.

The front wall 18 has an aperture 32 extending therein configured for receiving feet of the child therethrough. An aperture screen 34 is coupled to the support 12 and is positionable in a covered position 36 to cover the aperture 32. A closure 38 releasably couples the aperture screen 34 to the support 12 for retaining the aperture screen 34 in the covered position 36. The closure 38 may comprise a zipper, snaps or other conventional closure means. A divider 40 is coupled to the front wall 18 and is positioned in the aperture 32. The divider 40 extends upwardly from the bottom wall 14 of the support 12 defining a pair of feet openings 42, 44.

A seat 46 is coupled to the support 12 and is positioned within the interior space 30 of the support 12. The seat 46 may be pivoted upwardly or downwardly as desired. The seat 46 may also be slidable toward and away from the rear wall 20. A cushion 48 may be coupled to the seat 46. A collapsible canopy 50 is coupled to the support 12 and is positionable to extend over and provide shade to the support 12. A canopy screen 52 may be coupled to a front edge 54 of the canopy 50 and is extendable from the front edge 54 of the canopy 50 to the front wall 18 of the support 12.

A frame 56, which may be conventional, is provided having an upper section 58 and a lower section 60. The support 12 is coupled to the frame 56 at a juncture 62 between the upper 58 and lower 60 sections. The upper section 58 defines a handle 64 having a pair of spaced arms 66, 68 and a medial section 70 coupled to and extending between the spaced arms 66, 68. A distal end 70 of each arm 66, 68 relative to the medial section 70 of the handle 64 is pivotally coupled to the juncture 62 between the upper 58 and lower 60 sections. The medial portion 70 may be covered by a pad 72. The handle 64 may be telescopic in a generally conventional manner. A tray 74 is coupled to and extends between the spaced arms 66, 68 proximate the medial section 70. The tray 74 has a plurality of depressions 76, 78 extending therein. Each depression 76, 78 is configured for receiving a beverage container.

A plurality of wheels 80 is coupled to the lower section 60 of the frame 56. The wheels 80 include a pair of front wheels 82, 84 and a pair of rear wheels 86. The wheels 80 may be lockable in a generally conventional manner to prevent the wheels 80 from rotating when desired. The lower section 60 of the frame 56 coupled to the rear wheels 86 is pivotally coupled to the juncture 62 between the upper 58 and lower 60 sections for pivoting each of the rear wheels 86 toward an associated one of the front wheels 82, 84. This, in combination with the pivotable nature of the handle 64, permits the assembly 10 to pivot into a collapsed position 90 for compact storage of the assembly 10. The frame 56 is lockable in position via a conventional locking mechanism 88 that may include a biasing member 89 and a plurality of locking members 91 to allow the assembly to transition into and out of the collapsed position 90.

A plurality of panels 92 is coupled to the support 12. The panels 92 are positionable in a deployed position 93 wherein each of the panels 92 extends upwardly above the top edge 26 around the access opening 28 defining an upper enclosure 94 of the assembly 10. The plurality of panels 92 includes a front panel 96, a rear panel 98, a first lateral panel 100 and a second lateral panel 102. The first 100 and second 102 lateral panels are coupled to and extend between the front 96 and rear 98 panels. The front panel 96 is pivotally coupled to the front wall 18; the rear panel 98 is pivotally coupled to the rear wall 20; the first lateral panel 100 is pivotally coupled to the first lateral wall 22; and the second lateral panel 102 is pivotally coupled to the second lateral wall 24. Each of the panels 92 may comprise a screen 104 made of mesh or like material. The panels 92 may have a height extending from a first edge 103 to a second edge 105 of each panel 92 measuring between 22.0 cm and 30.0 cm. The second edge 105 of each panel 92 is pivotally coupled to the perimeter wall 16. The panels 92 abut an interior surface 107 of the perimeter wall 16 when the panels 92 are pivoted to a storage position 109.

A plurality of fasteners 106 removably couples together adjacently positioned ones of the panels 92. Each fastener 106 includes a first portion 108 of hook and loop fastener coupled to an exterior surface 110 of the upper enclosure 94 and a strap 112 having a second portion 114 of hook and loop fastener complementary to the first portion 108 of hook and loop fastener. Each strap 112 is coupled to the exterior surface 110 of the upper enclosure 94. Each strap 112 has a first end 116 coupled to an associated panel 92. Each strap 112 extends outwardly from the associated panel 92.

In use, a child is placed within the support 12 so that the feet of the child extend through the feet openings 42, 44. The seat 46 may be pivoted downwardly against the bottom wall 14 and the panels 92 pivoted upwardly above the top edge 26 of the support 12 to create a vertical extension of the perimeter wall 16. This structure allows the child to move about and play within the interior space 30 while ensuring that the child is safely retained therein. The aperture screen 34 can be positioned in a covered position 36 to cover the aperture 32. To convert back to a stroller, the seat 46 is pivoted upwardly and the panels 92 are pivoted downwardly against the perimeter wall 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A convertible baby stroller assembly comprising:
   a support having a bottom wall and a perimeter wall coupled to and extending upwardly from said bottom wall, a top edge of said support defining an access opening into an interior space of said support wherein said interior space is configured for receiving a child, said support having a front wall, said front wall having an aperture extending therethrough configured for receiving feet of the child therethrough;
   an aperture screen coupled to said front wall, said aperture screen being positionable in a covered position to cover said aperture;
   a seat coupled to said support, said seat being positioned within said interior space of said support;
   a plurality of panels coupled to said support, said panels being positionable in a deployed position wherein each of said panels extends upwardly above said top edge around said access opening defining an upper enclosure of said assembly;
   a frame having an upper section and a lower section, said upper section defining a handle, said support being coupled to said frame at a juncture between said upper and lower sections; and
   a plurality of wheels coupled to said lower section of said frame.

2. The assembly of claim 1, further comprising:
   said perimeter wall including said front wall, said rear wall, a first lateral wall and a second lateral wall, said first and second lateral walls being coupled to and extending between said front and rear walls;
   said plurality of panels including a front panel, a rear panel, a first lateral panel and a second lateral panel, said first and second lateral panels being coupled to and extending between said front and rear panels, said front panel being pivotally coupled to said front wall, said rear panel being pivotally coupled to said rear wall, said first lateral panel being pivotally coupled to said first lateral wall, said second lateral panel being pivotally coupled to said second lateral wall; and
   a plurality of fasteners removably coupling together adjacently positioned ones of said panels.

3. The assembly of claim 2, further comprising each said fastener being a first portion of hook and loop fastener coupled to an exterior surface of said upper enclosure and a strap having a second portion of hook and loop fastener complementary to said first portion of hook and loop fastener, each said strap being coupled to said exterior surface of said upper enclosure.

4. The assembly of claim 3, further comprising each said strap having a first end coupled to an associated one of said panels, said associated strap extending outwardly from said associated one of said panels.

5. The assembly of claim 1, further comprising each of said panels comprising a screen.

6. The assembly of claim 1, further comprising a canopy coupled to said support, said canopy being positionable to extend over and provide shade to said support.

7. The assembly of claim 6, further comprising wherein said canopy is collapsible.

8. The assembly of claim 6, further comprising a canopy screen coupled to a front edge of said canopy, said canopy screen being extendable from said front edge of said canopy to a front wall of said support.

9. The assembly of claim 1, further comprising a divider coupled to said front wall and positioned in said aperture, said divider extending upwardly from said bottom wall of said support defining a pair of feet openings.

10. The assembly of claim 1, further comprising a closure releasably coupling said aperture screen to said support for retaining said aperture screen in the covered position.

11. The assembly of claim 1, further comprising:
said handle having a pair of spaced arms and a medial section coupled to and extending between said spaced arms; and
a distal end of each said arm relative to said medial section of said handle being pivotally coupled to said juncture between said upper and lower sections.

12. The assembly of claim 1, further comprising said handle being telescopic.

13. The assembly of claim 1, further comprising said wheels including a pair of front wheels and a pair of rear wheels, said lower section of said frame coupled to said rear wheels being pivotally coupled to said juncture between said upper and lower sections for pivoting each of said rear wheels toward an associated one of said front wheels.

14. The assembly of claim 1, further comprising:
said handle having a pair of spaced arms and a medial section coupled to and extending between said spaced arms; and
a tray coupled to and extending between said spaced arms proximate said medial section.

15. The assembly of claim 14, further comprising said tray having a depression extending therein, said depression being configured for receiving a beverage container.

16. A convertible baby stroller assembly comprising:
a support having a bottom wall and a perimeter wall coupled to and extending upwardly from said bottom wall, said perimeter wall including a front wall, a rear wall, a first lateral wall and a second lateral wall, said first and second lateral walls being coupled to and extending between said front and rear walls, a top edge of said support defining an access opening into an interior space of said wherein said interior space is configured for receiving a child, said front wall having an aperture extending therein configured for receiving feet of the child therethrough;
an aperture screen coupled to said front wall, said aperture screen being positionable in a covered position to cover said aperture;
a closure releasably coupling said aperture screen to said support for retaining said aperture screen in the covered position, said closure comprising a zipper;
a divider coupled to said front wall and positioned in said aperture, said divider extending upwardly from said bottom wall of said support defining a pair of feet openings;
a seat coupled to said support, said seat being positioned within said interior space of said support, a cushion coupled to said seat;
a canopy coupled to said support, said canopy being positionable to extend over and provide shade to said support, said canopy being collapsible;
a canopy screen coupled to a front edge of said canopy, said canopy screen being extendable from said front edge of said canopy to said front wall of said support;
a frame having an upper section and a lower section, said upper section defining a handle, said support being coupled to said frame at a juncture between said upper and lower sections, said handle having a pair of spaced arms and a medial section coupled to and extending between said spaced arms, a distal end of each said arm relative to said medial section of said handle being pivotally coupled to said juncture between said upper and lower sections, a pad covering said medial section, said handle being telescopic;
a tray coupled to and extending between said spaced arms proximate said medial section, said tray having a plurality of depressions extending therein, each said depression being configured for receiving a beverage container therein;
a plurality of wheels coupled to said lower section of said frame, said wheels including a pair of front wheels and a pair of rear wheels, said lower section of said frame coupled to said rear wheels being pivotally coupled to said juncture between said upper and lower sections for pivoting each of said rear wheels toward an associated one of said front wheels;
a plurality of panels coupled to said support, said panels being positionable in a deployed position wherein each of said panels extends upwardly above said top edge around said access opening defining an upper enclosure of said assembly, said plurality of panels including a front panel, a rear panel, a first lateral panel and a second lateral panel, said first and second lateral panels being coupled to and extending between said front and rear panels, said front panel being pivotally coupled to said front wall, said rear panel being pivotally coupled to said rear wall, said first lateral panel being pivotally coupled to said first lateral wall, said second lateral panel being pivotally coupled to said second lateral wall, each of said panels comprising a screen; and
a plurality of fasteners removably coupling together adjacently positioned ones of said panels, each said fastener being a first portion of hook and loop fastener coupled to an exterior surface of said upper enclosure and a strap having a second portion of hook and loop fastener complementary to said first portion of hook and loop fastener, each said strap being coupled to said exterior surface of said upper enclosure, each said strap having a first end coupled to an associated one of said panels, said associated strap extending outwardly from said associated one of said panels.

\* \* \* \* \*